(12) United States Patent
Tobkin

(10) Patent No.: US 12,304,055 B2
(45) Date of Patent: May 20, 2025

(54) REMOTE SPRAY FOAM SYSTEM FOR POLYURETHANE INSULATION FOAM

(71) Applicant: Nathan John Tobkin, Perham, MN (US)

(72) Inventor: Nathan John Tobkin, Perham, MN (US)

( * ) Notice: Subject to any disclaimer, the term of this patent is extended or adjusted under 35 U.S.C. 154(b) by 0 days.

(21) Appl. No.: 18/441,893

(22) Filed: Feb. 14, 2024

(65) Prior Publication Data

US 2024/0269859 A1 Aug. 15, 2024

Related U.S. Application Data

(60) Provisional application No. 63/485,238, filed on Feb. 15, 2023.

(51) Int. Cl.
| | | |
|---|---|---|
| *B05B 15/50* | (2018.01) | |
| *B05B 3/18* | (2006.01) | |
| *B05B 7/00* | (2006.01) | |
| *B05B 13/02* | (2006.01) | |
| *B25J 11/00* | (2006.01) | |

(52) U.S. Cl.
CPC ............ *B25J 11/0075* (2013.01); *B05B 3/18* (2013.01); *B05B 7/0018* (2013.01); *B05B 13/0278* (2013.01); *B05B 15/50* (2018.02)

(58) Field of Classification Search
CPC ...... B05B 13/005; B05B 13/0431; B25J 5/00; B25J 5/005; B25J 5/007; B25J 11/0075; B25J 9/1664
See application file for complete search history.

(56) References Cited

U.S. PATENT DOCUMENTS

| | | | | |
|---|---|---|---|---|
| 5,183,066 A | * | 2/1993 | Hethcoat | B05B 15/555 134/102.2 |
| 5,358,568 A | * | 10/1994 | Okano | B05B 15/68 118/712 |
| 5,693,150 A | * | 12/1997 | Powell | B08B 3/02 134/102.1 |
| 11,499,325 B2 | | 11/2022 | Telleria et al. | |
| 11,673,156 B2 | * | 6/2023 | Hargadon | B05B 12/124 427/424 |
| 2006/0275552 A1 | | 12/2006 | Vendlinski et al. | |
| 2009/0304940 A1 | * | 12/2009 | Heldt | B25J 9/0084 427/427.2 |
| 2010/0143089 A1 | * | 6/2010 | Hvass | G05D 1/027 414/754 |
| 2019/0255551 A1 | * | 8/2019 | Hargadon | B25J 9/1664 |
| 2021/0094056 A1 | | 4/2021 | Storr | |
| 2022/0080444 A1 | | 3/2022 | Park et al. | |
| 2022/0143640 A1 | | 5/2022 | Raman et al. | |
| 2022/0212210 A1 | * | 7/2022 | Feller | B05B 13/005 |
| 2022/0305514 A1 | * | 9/2022 | Pungetti | B08B 3/08 |
| 2022/0410189 A1 | * | 12/2022 | Yamauchi | B05B 1/306 |

* cited by examiner

*Primary Examiner* — Karl Kurple
(74) *Attorney, Agent, or Firm* — Fargo Patent & Business Law; Thomas Kading

(57) ABSTRACT

A remote spray foam system includes a mast; a robot platform mounted to the mast; a remote manipulator mounted to the robot platform; a hand-held spray gun operable to spray foam, the hand-held spray gun removably mountable to the remote manipulator; and a control system operable to position the mast, and the remote manipulator to position and operate the spray gun.

13 Claims, 9 Drawing Sheets

REMOTE SPRAY FOAM SYSTEM FOR POLYURETHANE INSULATION FOAM

CROSS REFERENCE TO RELATED APPLICATION[S]

The present disclosure claims priority to U.S. Provisional Patent Application No. 63/485,238 filed Feb. 15, 2023.

BACKGROUND

The present disclosure relates to a remote spray foam system.

Even with effective engineering controls, personnel who work with spray polyurethane foam (SPF) chemicals still need to wear appropriate Personal Protective Equipment (PPE). Generally, PPE is required for applicators and adjacent workers who may enter a spray foam application work area. However, bear in mind that formulations of SPF may vary, particularly with respect to B-side chemicals. Appropriate work area restrictions (signs or tape) are typically required to limit entry into the spray enclosure or spray area to personnel wearing proper PPE until the level of airborne concentrations of chemical substances is below the applicable occupational exposure limits.

Generally, PPE requirements include respiratory protection. Air-purifying respirators (APR) and powered air-purifying respirators (PAPR) are generally appropriate for exterior applications and may be used when spraying polyurethane foam in exterior applications. Supplied air respirators (SAR) are typically used in interior applications.

SUMMARY

A remote spray foam system according to one disclosed non-limiting embodiment of the present disclosure includes a mast; a robot platform mounted to the mast; a remote manipulator mounted to the robot platform; a hand-held spray gun operable to spray foam, the hand-held spray gun removably mountable to the remote manipulator; and a control system operable to position the mast, and the remote manipulator to position and operate the spray gun.

A further embodiment of any of the foregoing embodiments of the present disclosure includes that a mobile platform; a mast mounted to the mobile platform, wherein the mobile platform comprises a drivable vertical mast, the control system operable to position the mobile platform.

A further embodiment of any of the foregoing embodiments of the present disclosure includes, wherein, wherein the remote manipulator is a 6-axis robot.

A further embodiment of any of the foregoing embodiments of the present disclosure includes that a control interface in communication with the control system.

A further embodiment of any of the foregoing embodiments of the present disclosure includes, wherein, wherein the control interface is in wired communication with the control system.

A further embodiment of any of the foregoing embodiments of the present disclosure includes, wherein, wherein the hand-held spray gun is in fluid communication with a remote foam supply.

A further embodiment of any of the foregoing embodiments of the present disclosure includes that a cleaning station mounted to the robot platform adjacent to the remote manipulator.

A further embodiment of any of the foregoing embodiments of the present disclosure includes, wherein, wherein the cleaning station comprises a brush system.

A further embodiment of any of the foregoing embodiments of the present disclosure includes, wherein, wherein the cleaning station comprises a solvent sprayer system.

A further embodiment of any of the foregoing embodiments of the present disclosure includes, wherein, wherein the cleaning station comprises an internal nozzle cleaner system.

A remote spray foam system according to one disclosed non-limiting embodiment of the present disclosure includes a robot platform; a remote manipulator mounted to the robot platform; a hand-held spray gun operable to spray foam, the hand-held spray gun removably mounted to the remote manipulator; and a cleaning station mounted to the robot platform adjacent to the remote manipulator.

A further embodiment of any of the foregoing embodiments of the present disclosure includes that a mobile platform; a mast mounted to the mobile platform; and a robot platform mounted to the mast.

A further embodiment of any of the foregoing embodiments of the present disclosure includes that a control interface in communication with the control system.

A further embodiment of any of the foregoing embodiments of the present disclosure includes, wherein, wherein the control interface is in wired communication with the control system.

A further embodiment of any of the foregoing embodiments of the present disclosure includes, wherein, wherein the cleaning station comprises a brush system.

A further embodiment of any of the foregoing embodiments of the present disclosure includes, wherein, wherein the cleaning station comprises a solvent sprayer system.

A further embodiment of any of the foregoing embodiments of the present disclosure includes, wherein, wherein the cleaning station comprises an internal nozzle cleaner system.

A further embodiment of any of the foregoing embodiments of the present disclosure includes, wherein, wherein the remote manipulator is a 6-axis robot.

A further embodiment of any of the foregoing embodiments of the present disclosure includes, wherein, wherein the robot platform is removably mountable to a mast of a drivable vertical mast.

A further embodiment of any of the foregoing embodiments of the present disclosure includes that a control system operable to position and operate the spray gun.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
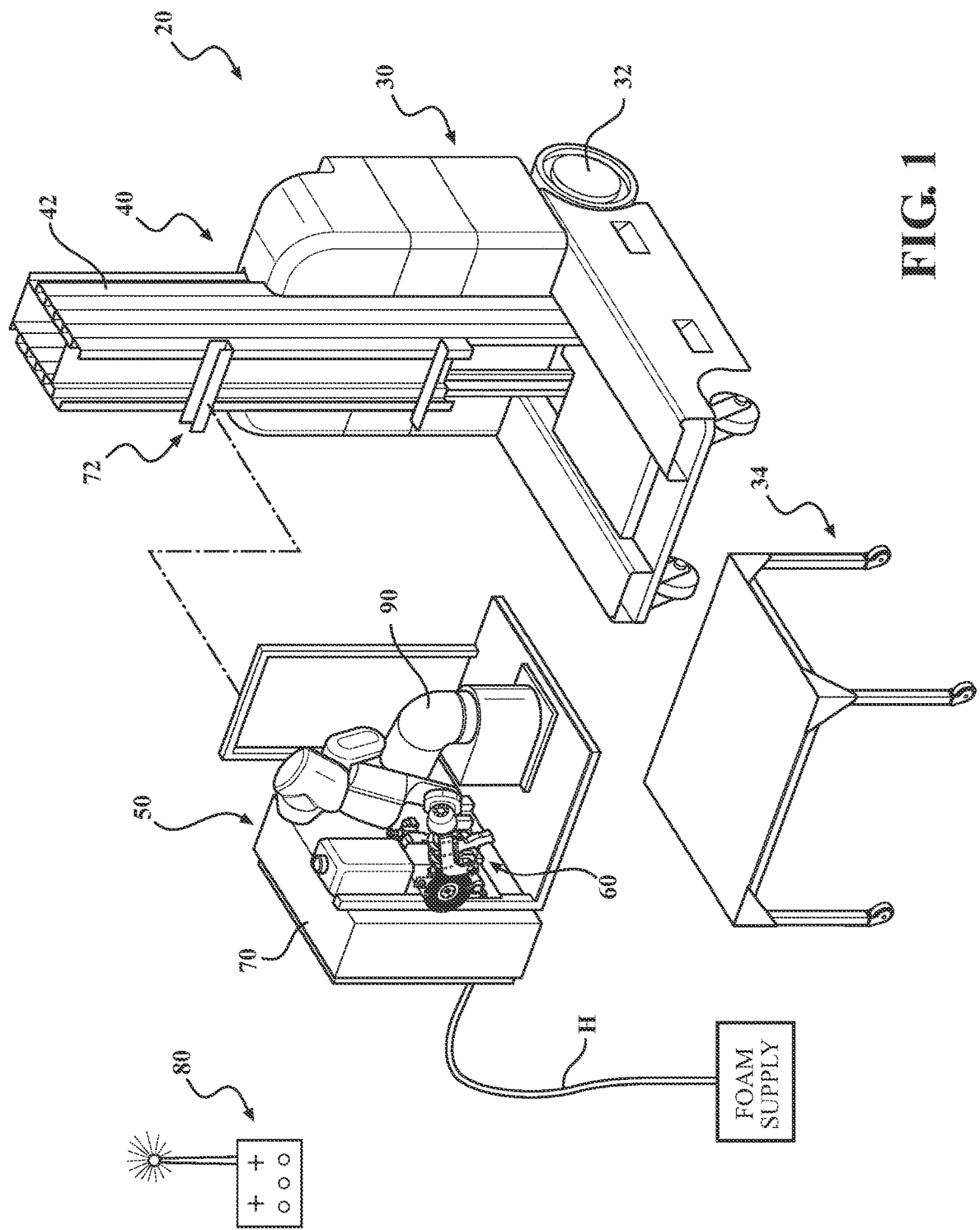
FIG. 1 is an exploded view of a remote spray foam system according to one disclosed non-limiting embodiment.
Figure 6:
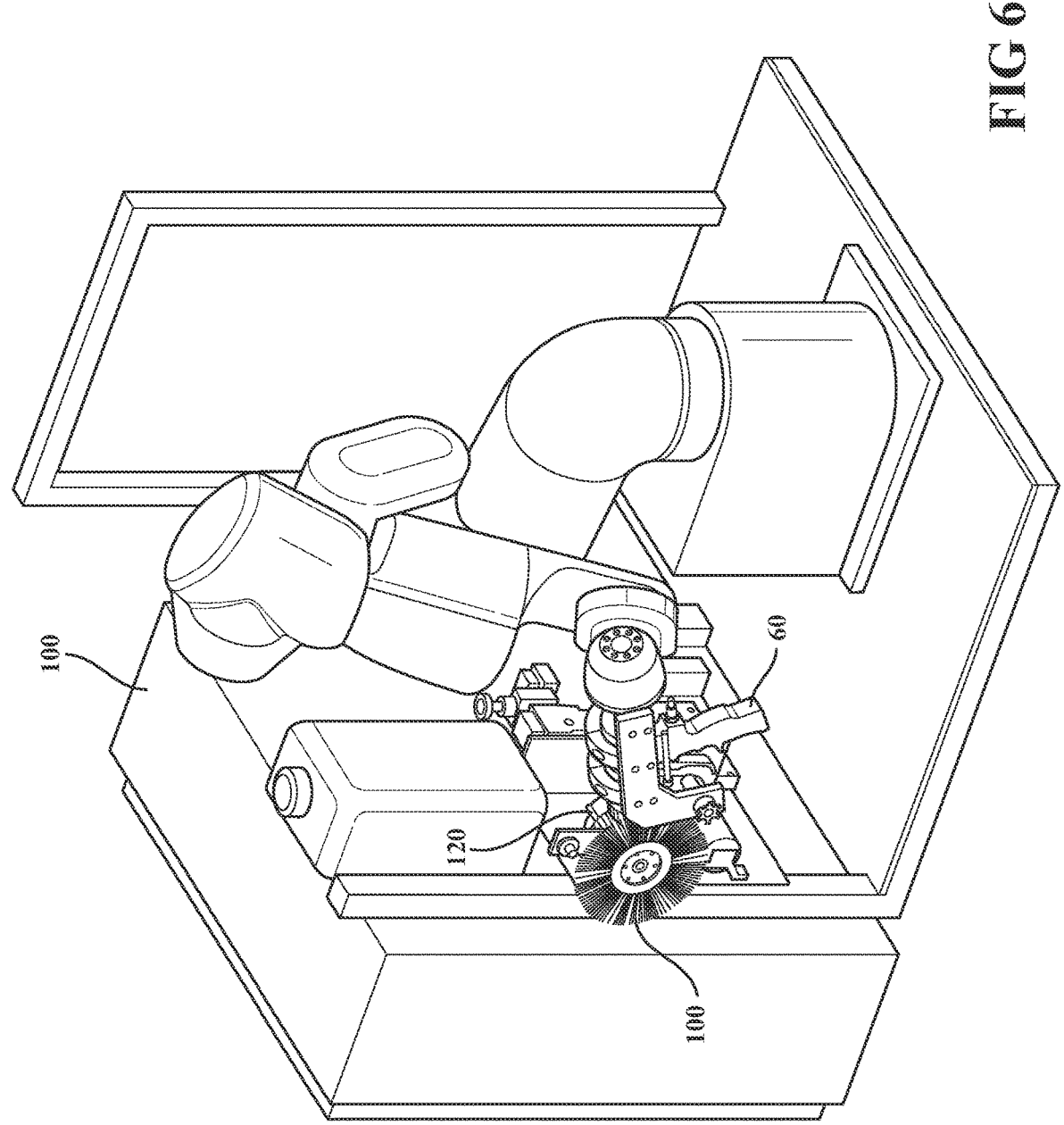
FIG. 6 is a perspective view of the spray gun positioned adjacent to a cleaning station of the remote spray foam system according to one disclosed non-limiting embodiment.

FIG. 1 schematically illustrates a remote spray foam system 20 that facilitates the application of an insulation foam with minimal requirements for use of Personal Protective Equipment (PPE). The remote spray foam system 20 generally includes a mobile mast platform 30, a mast 40, a robot platform 50, a spray gun 60, a control system 70, a control interface 80, a remote manipulator 90 and a cleaning station 100 (FIG. 6). It should be appreciated that the specific placements and connections of elements are exemplary only, and that these elements may be combined or have relative spatial locations other than those shown. It should also be appreciated that numerous supporting elements are not shown which may include for example and without limitation cabling, hoses or tubes for fluid transport, electromechanical servo-mechanisms for various movements of various elements, communications ports, self-contained portable lighting, etc.

The mobile mast platform 30 may include powered steerable wheels 32 or other motive devices such as caterpillar treads to provide locomotion and positioning of the mobile mast platform 30 in response to the control system 70. The mobile mast platform 30 may be, for example only, a JLG 20MVL drivable vertical mast manufactured by JLG which is an Oshkosh Corporation Company. In one embodiment, the mobile mast platform 30 may be remotely controlled via the control system 70 in response to the control interface 80. In another embodiment, the mobile mast platform 30 may be a fixed platform with the mast 40.

The mast 40 extends and retracts from the mobile mast platform 30 to provide a controlled vertical component to the robot platform 50 and the remote manipulator 90 that is attached thereto. The mast 40 may include a multiple of telescopic members 42 that selectively extend and retract via the control system 70 in response to the control interface 80. In one embodiment, the mast 40 may extend to heights of 18 feet.

Figure 2:
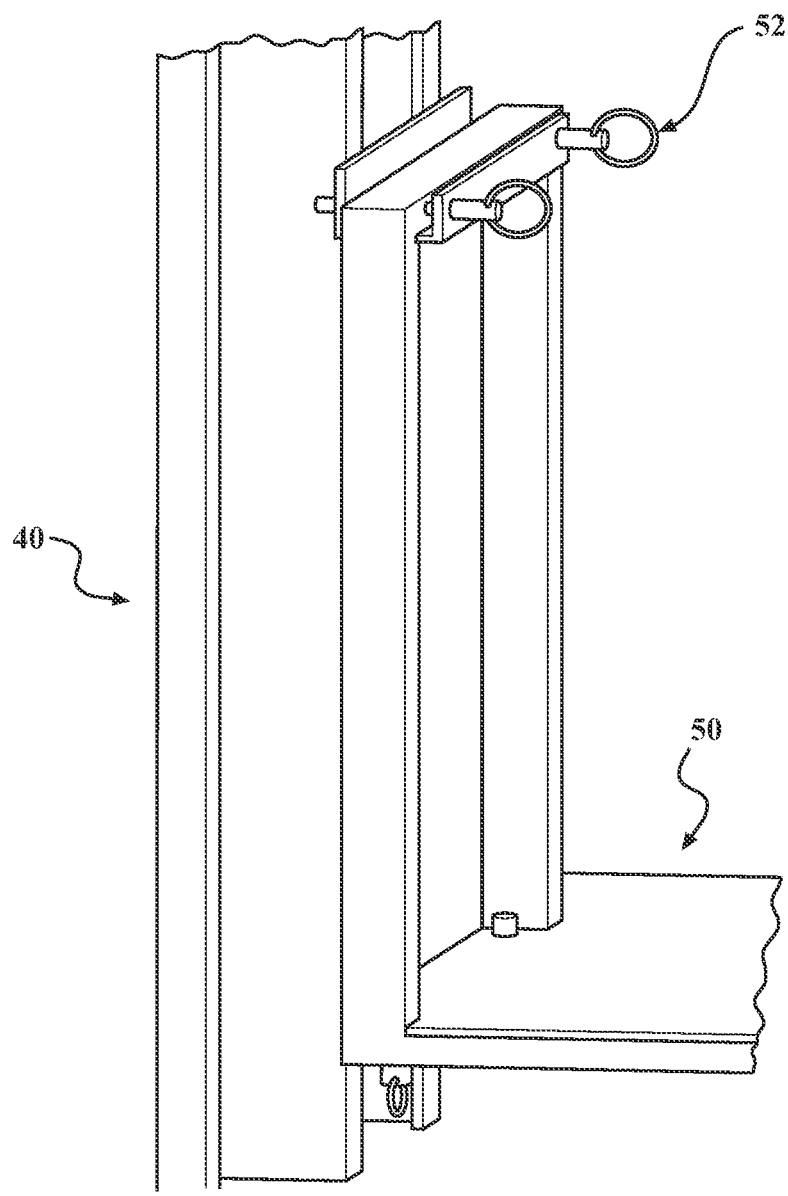
FIG. 2 is an expanded perspective view of a robot platform attached to a mast of a mobile mast platform.

The robot platform 50 is removably attached to the mast 40. The robot platform 50 includes a quick disconnect system 52 (also shown in FIG. 2) to mount the robot platform 50 via, for example, four (4) pins. The robot platform 50 may support and protect the control system 70, the remote manipulator 90 and the cleaning station 100. That is, the robot platform 50 contains the ancillary components, such as pumps, microprocessors, communication links with the mobile mast platform 30, computer hardware, fluid supplies, etc. The ancillary components may be protected within an enclosure.

Figure 3:
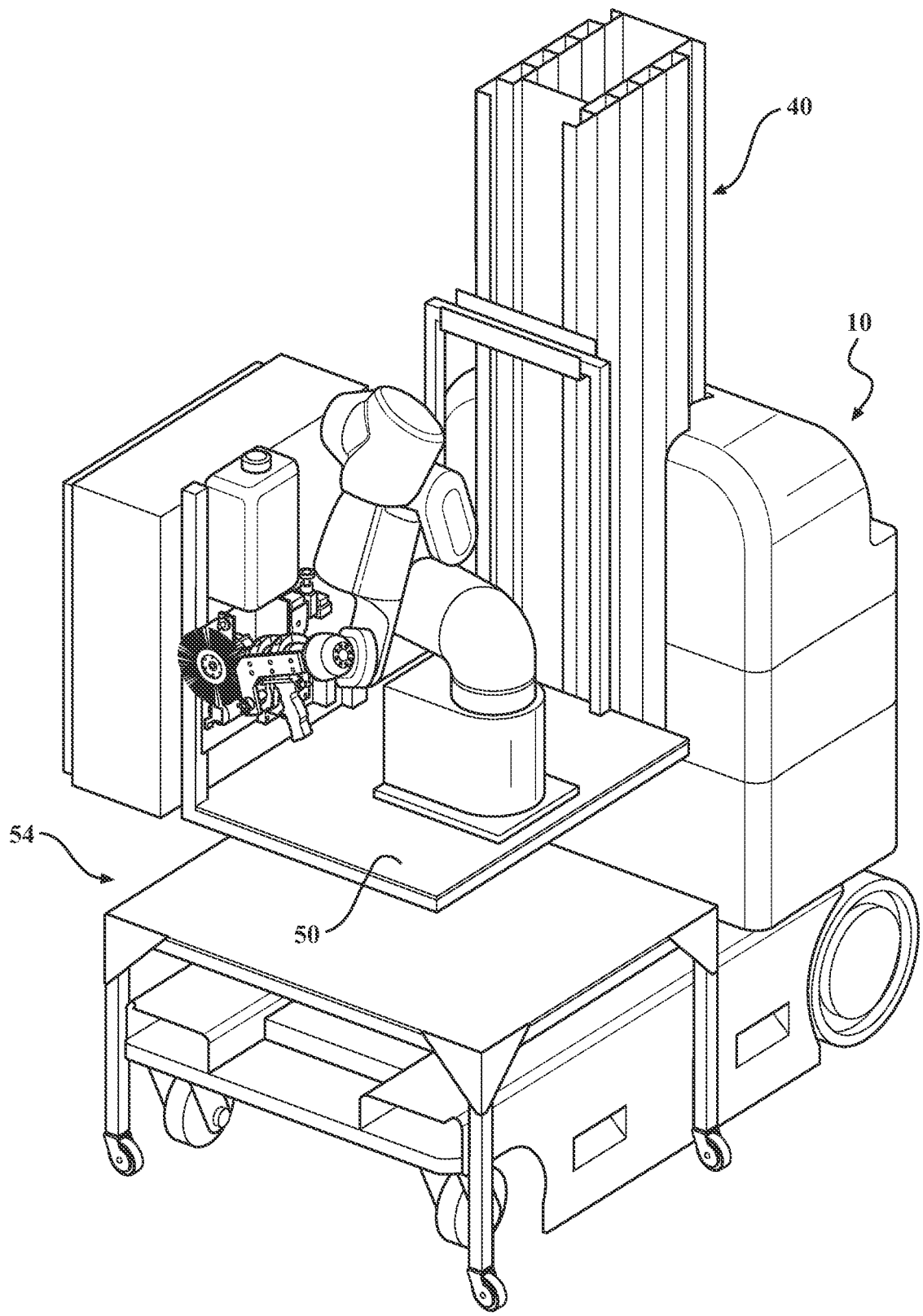
FIG. 3 is perspective view of the remote spray foam system.

To facilitate the attachment and removal of the robot platform 50 to the mast 40, a wheeled cart 54 may be positioned with respect to the mobile mast platform 30 (FIG. 3). The wheeled cart 54 may include lockable castors to receive the robot platform 50.

The spray gun 60 may be a conventional hand-held foam spray gun with a remote supply of foam from a foam source. The spray gun 60 may form polyurethane insulation foam from two unique liquid components that are communicated through hoses H such as through the correct combination of heat, pressure, and spray gun configuration. The mixing may occur by impingement in which the A-side chemical (known as ISO or isocyanate) collides with the B-side chemical (known as Resin or polyol polyether resin) at a high velocity to mix properly. The spray gun 60 may spray and/or pour the foam.

Figure 4:
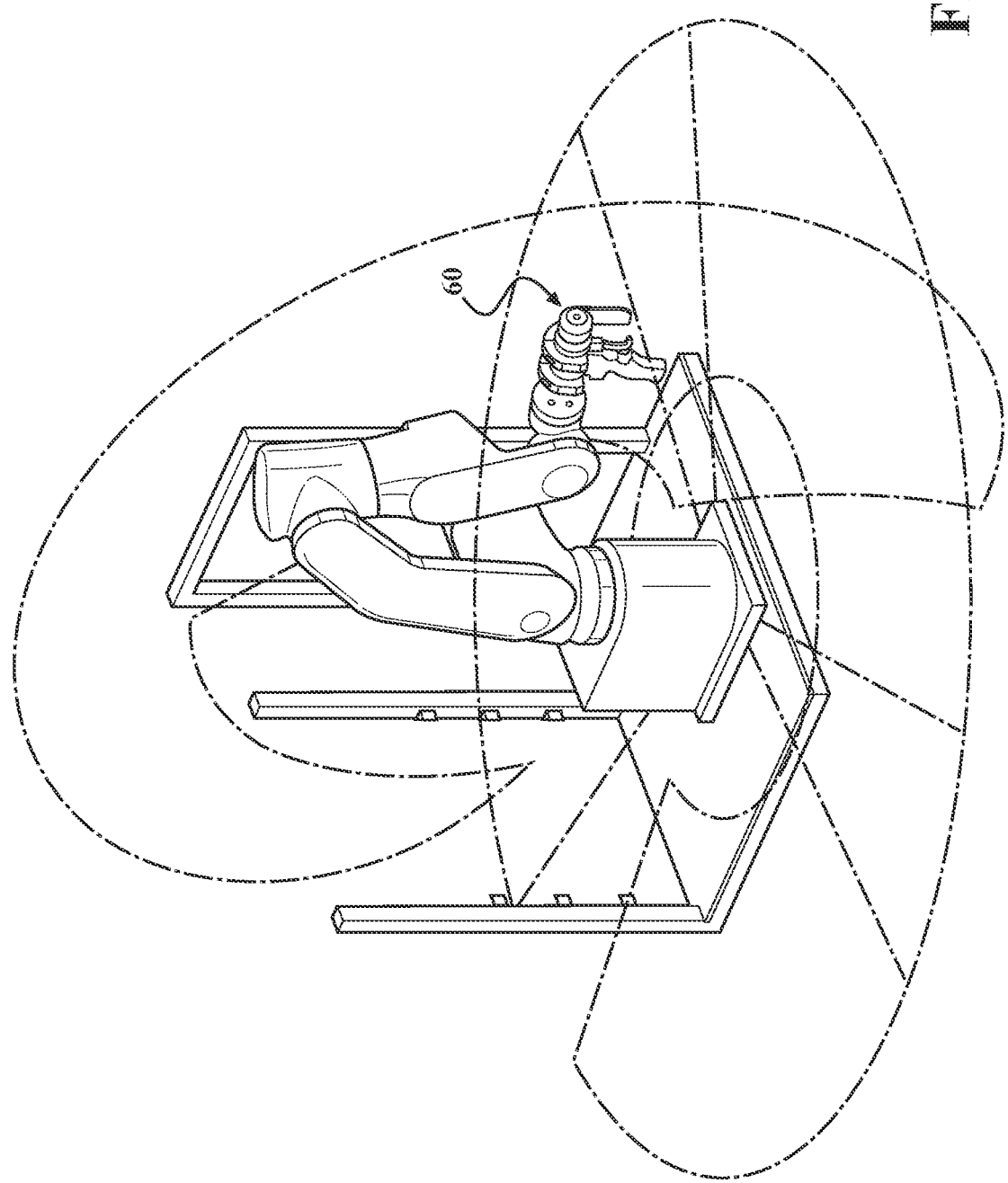
FIG. 4 is a schematic view of a 6-axis remote manipulator of the remote spray foam system.

With reference to FIG. 4, the remote manipulator 90 operates to receive and operate the spray gun 60. The remote manipulator 90 may include, for example, an Epson VT6L 6-Axis Robot that is operable to move in the x, y, and z planes. In addition, the 6-Axis Robot can perform roll, pitch, and yaw movements.

Each axis represents an independent motion, or degree of freedom, that allows the spray gun 60 to be moved to a programmed point in response to the control interface 80. The spray gun 60 may be in direct view of the operator or may include various camera, First person view, or other remote visual interfaces.

The movements for each axis of the six-axis robot may include: Axis one which is located at the base of the robot. With this axis the remote manipulator 90 is able to move from left to right for a complete 180 degrees of motion from its center. This provides a robot with the ability to move an object along a straight line; Axis Two controls the robot lower arm and provides the ability for the movement of forward and backward extensions. This allows a robot to mast an object, move it sideways, up and down, or to set the object down along the x or y planes; Axis Three provides the remote manipulator 90 with the ability to raise and lower the upper arm, expanding their vertical reach. Axis three makes parts more accessible to the remote manipulator 90 since it allows the same movements as axis two, but along all three x, y, and z planes; Axis Four allows the remote manipulator 90 to control the movements of the robot end of arm tooling (EOAT), e.g., the spray gun 60, and change the orientation through a rolling motion. The upper robotic arm will rotate in a circular motion in the roll movement; Axis Five also controls the movements of the robot end-effector along with axis four. Axis five is responsible for the pitch and yaw movements. Pitch movements involve moving the end-effector up and down. While yaw movements move the end-effector left and right; Axis Six is the wrist which is responsible for the complete 360-degree rotations of the wrist. The sixth axis provides the ability to change a part's orientation in the x, y, and z planes with roll, pitch, and yaw movements.

Figure 5:
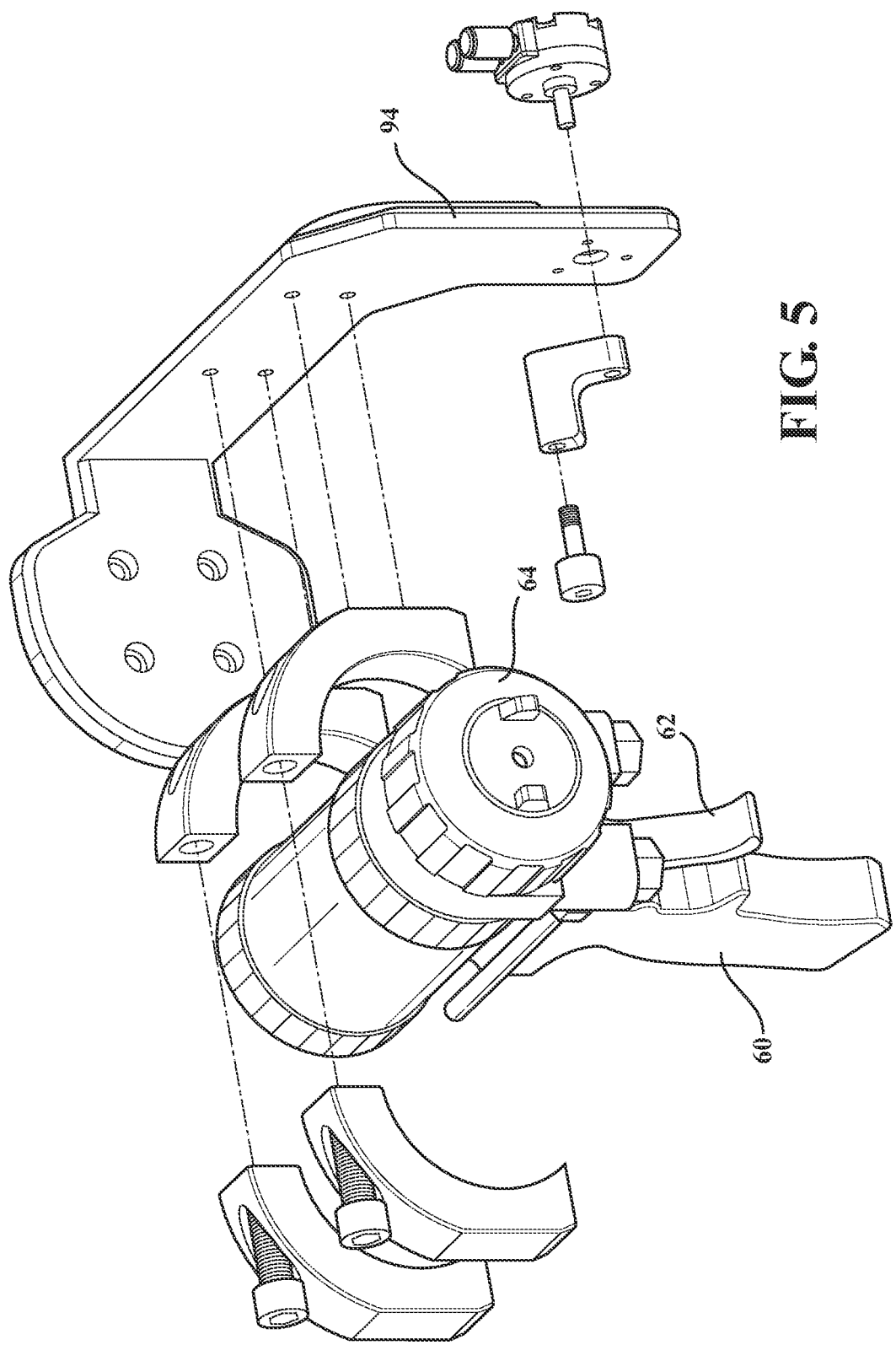
FIG. 5 is an expanded perspective view of a first effector to operate the spray gun.

With reference to FIG. 5, the remote manipulator 90 provides the ability to mount and operate different types of spray guns. The spray gun 60 may be a conventional hand-held foam spray gun of various types. The spray gun 60 may be attached as end of arm tooling (EOAT) or other dedicated attachment that may be attached using a hand screw/quarter turn for ease of mounting. The spray gun 60 may be removed from the remote manipulator 90 for transport and for access when manual spraying is required.

The remote manipulator 90 may include a first effector 94 to operate the spray gun 60. The first effector 94 may be a pneumatic rotary actuator, stepper motor, servo, linear actuator, or other device in communication with the control system 70 to selectively operate the spray gun 60. The first effector 94 is positioned adjacent to a trigger 62 of the spray gun 60 to operate a nozzle 64 of the spray gun 60. The first effector 94 is operable to actuate the trigger 62 and thereby spray the foam as in manual operation of the spray gun 60.

Figure 7:
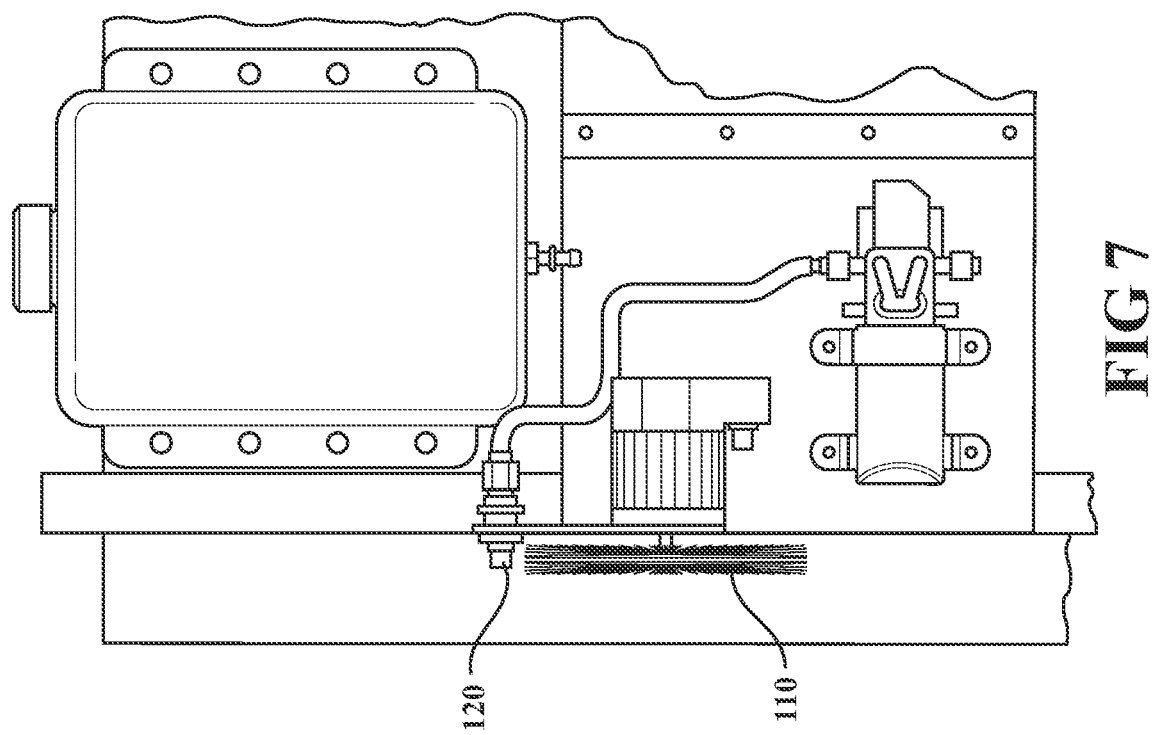
FIG. 7 is an expanded front view of the cleaning station of the remote spray foam system according to one disclosed non-limiting embodiment.
Figure 8:
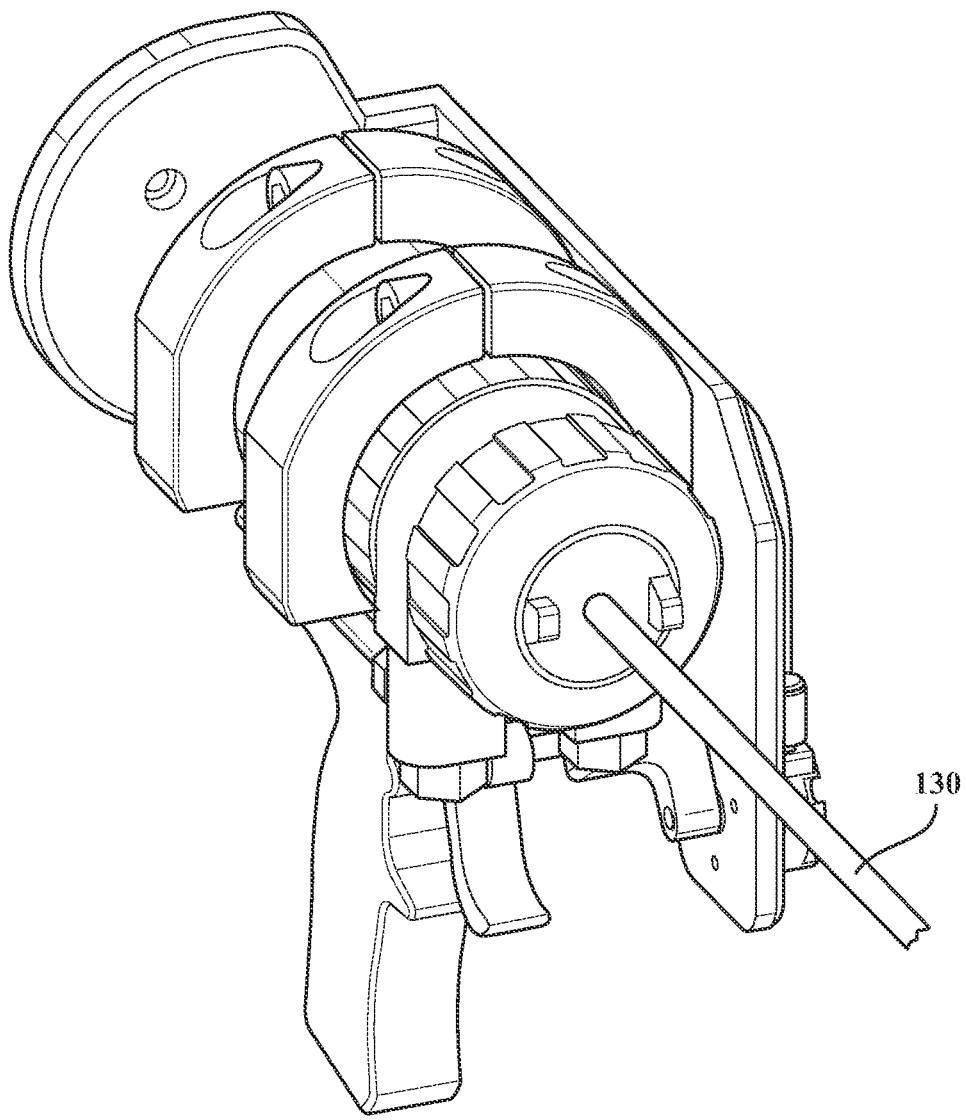
FIG. 8 is an expanded perspective view of an internal nozzle cleaner system of the cleaning station of the remote spray foam system according to one disclosed non-limiting embodiment.

With reference to FIG. 6, the cleaning station 100 is mounted to the robot platform 50 adjacent to the remote manipulator 90. The cleaning station 100 may include a brush system 110 (FIG. 7), a solvent sprayer system 120 (FIG. 7), and/or an internal nozzle cleaner system 130 (FIG. 8) to clean the nozzle 64 of the spray gun 60. The brush system 110 may include, for example, a wire brush driven by a 24-75DC clear path motor. The brush system 110 may cover the entire tip of the nozzle 64 to assure cleaning. The solvent sprayer system 120 may spray or drip a solvent such as, for example, N Methyl Pyrrolidone (NMP), Dynasolve CU-6, SB Versaflex-brand, etc.

Figure 9:
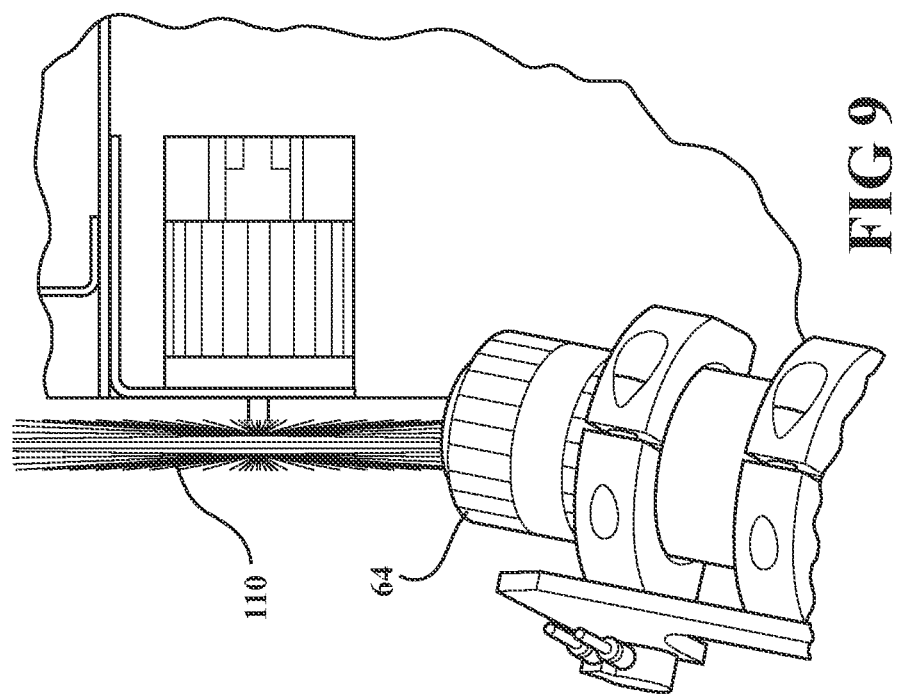
FIG. 9 is an expanded perspective view of a brush system of the cleaning station of the remote spray foam system according to one disclosed non-limiting embodiment.

The remote manipulator 90, the brush system 110, the solvent sprayer system 120, and/or the internal nozzle cleaner system 130 may operate automatically and/or manually to clean the nozzle 64. That is, a preprogrammed position (FIG. 9) may be defined by the remote manipulator 90 to position the nozzle 64 against the brush system 110 via, for example, a one touch button on the control interface 80. The solvent sprayer system 120 may spray the nozzle 64 and/or the brush system 110 with a solvent. The internal nozzle cleaner system 130 may include, for example, a drill bit, rod, rod brush, etc. that internally cleans the nozzle 64. Alternatively, or additionally, the remote manipulator 90 may override current spraying operations to automatically position the nozzle 64 with respect to the cleaning station 100 every predetermined time period such as, for example, every 20 minutes.

Figure 10:
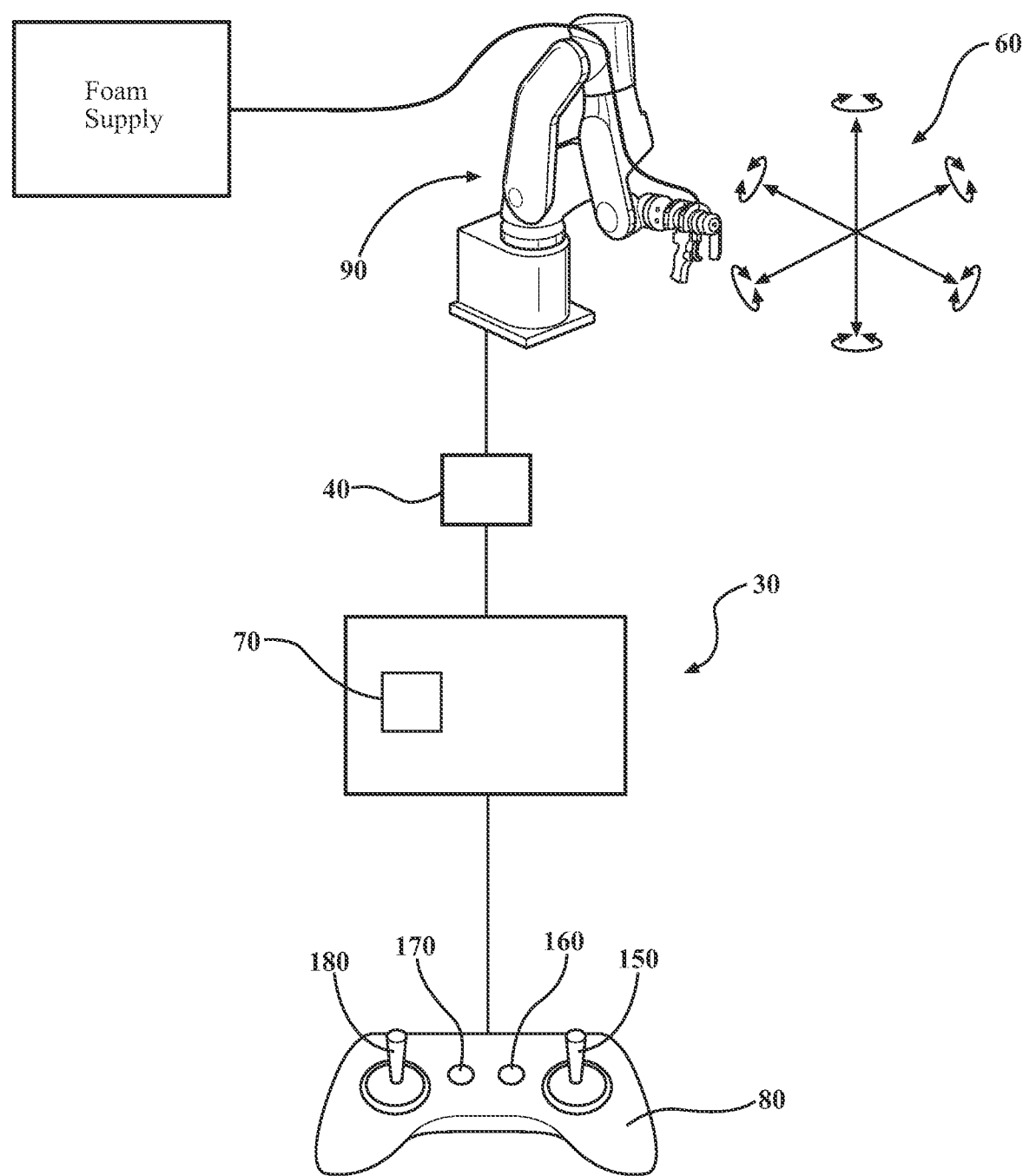
FIG. 10 is a schematic view of a control system for the remote spray foam system according to one disclosed non-limiting embodiment.

With reference to FIG. 10, the control system 70 (illustrated schematically) may include a processor, a memory, and an interface. The processor may be any type of known microprocessor having desired performance characteristics. The memory may be any computer readable medium which stores data and control algorithms such as the logic utilized to operate the remote spray foam system 20 in response to the control interface 80. The control interface 80 receives user input so as to remotely position and operate the spray gun 60.

The control interface 80 may provide a wired or wireless connection via, for example, Bluetooth, Wi-fi, cellular etc. The control interface 80 may include various manual input devices such as switches, toggles, joysticks, etc. The control interface 80, in one embodiment, may include a joystick 150 to remotely position the spray gun 60, a button 160 to operate the first effector 94 to spray the foam, a button 170 to automatically position the spray gun 60 to the cleaning position for cleaning at the cleaning station 100, a joystick 180 to remotely position the mobile mast platform 30, a button 190 to operate the height of the mast 40, etc.

Various other configurations as well as automated computer control can be utilized in addition or in the alternative to the manual control interface 80. Alternatively, the control system 70 may include an interface that permits a programming interface in which a user measures all the openings and perimeters of a side of the structure so that the remote spray foam system 20 will autonomously spray in accords with the measurements.

The control interface 80 provides for remote operation of the remote spray foam system 20 without the user having to manually hold the spray gun 60. That is, the remote spray foam system 20 may be positioned within visual range of the user, which may allow a reduction in the use of PPE by the user who need not be directly adjacent to the spray such as, for example, when spraying the roof of a pole barn or other structure.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed is:

1. A remote spray foam system for polyurethane insulation foam, comprising:
   a mobile mast platform;
   a mast mounted to the mobile mast platform, the mast extendable and retractable with respect to the mobile mast platform;
   a robot platform removably mounted to the mast;
   a remote manipulator mounted to the robot platform;
   a spray gun;
   wherein said spray gun is a hand-held spray gun operable to spray the polyurethane insulation foam, the spray gun removably mountable to the remote manipulator;
   a control system in communication with the remote manipulator to position and operate the spray gun,
   a control interface in communication with the control system, the control interface operable to receive a user input to remotely control the mobile mast platform, the mast, and the remote manipulator to position and operate the spray gun; and
   a first effector mounted to the remote manipulator adjacent to a trigger of the spray gun to operate the spray gun to spray polyurethane insulation foam.

2. The remote spray foam system as recited in claim 1, wherein the remote manipulator is a 6-axis robot mounted atop the robot platform.

3. The remote spray foam system as recited in claim 1 wherein the control interface is in wired communication with the control system.

4. The remote spray foam system as recited in claim 1, wherein the spray gun is in fluid communication with a remote foam supply.

5. The remote spray foam system as recited in claim 1, further comprising a cleaning station that comprises a brush system.

6. The remote spray foam system as recited in claim 1, further comprising a cleaning station that comprises a solvent sprayer system.

7. The remote spray foam system as recited in claim 1, further comprising a quick disconnect system to mount the robot platform to the mast.

8. The remote spray foam system as recited in claim 1, further comprising a cleaning station mounted to the robot platform, the cleaning station comprises a brush system and a solvent sprayer system to selectively clean a nozzle of the spray gun.

9. The remote spray foam system as recited in claim 4, wherein the spray gun is removable for hand-held operation.

10. The remote spray foam system as recited in claim 1, wherein the control interface comprises a joystick to remotely position the spray gun and a button to spray the polyurethane insulation foam.

11. The remote spray foam system as recited in claim 10, wherein the control interface comprises a button to automatically position the spray gun to the cleaning position for cleaning at a cleaning station.

12. The remote spray foam system as recited in claim 2, wherein the mast extending in a direction is perpendicular to the robot platform.

13. A remote spray foam system for polyurethane insulation foam, comprising:
- a mobile mast platform;
- a mast mounted to the mobile mast platform, the mast extendable and retractable with respect to the mobile mast platform;
- a robot platform removably mounted to the mast, the mast perpendicular to the robot platform;
- a quick disconnect system to mount the robot platform to the mast;
- a remote manipulator mounted to the robot platform, the remote manipulator comprises a 6-axis robot;
- a spray gun;
- said spray gun is a spray gun operable to spray the polyurethane insulation foam, the spray gun removably mountable to the remote manipulator, the spray gun removable for hand-held operation;
- a first effector mounted to the remote manipulator adjacent to a trigger of the spray gun to operate the spray gun to spray the polyurethane insulation foam;
- a cleaning station that comprises a brush system and a solvent sprayer system to selectively clean a nozzle of the spray gun;
- the cleaning station mounted to the robot platform, the cleaning station comprises a brush system and a solvent sprayer system to selectively clean the nozzle of the spray gun; and
- a control interface in communication with the control system, the control interface operable to receive a user input to remotely control the mobile mast platform, the mast, and the remote manipulator to position and operate the spray gun.

* * * * *